United States Patent
Cavanna et al.

(10) Patent No.: US 8,125,751 B2
(45) Date of Patent: Feb. 28, 2012

(54) METHOD FOR SECTIONING WITH A SECTION SWITCH A MEDIUM-VOLTAGE ELECTRIC POWER DISTRIBUTION LINE EXHIBITING A DISTURBANCE, SECTION SWITCH FOR MEDIUM-VOLTAGE ELECTRIC POWER DISTRIBUTION LINE APPLICABLE THEREON AND ELECTRONIC CIRCUIT FOR DETECTING A FAULT CURRENT AND COMPRISED BY SAID SECTION SWITCH

(75) Inventors: Jorge Cavanna, Munro (AR); Javier Cavanna, Munro (AR)

(73) Assignee: ABB Technology AG, Zurich (CH)

( * ) Notice: Subject to any disclaimer, the term of this patent is extended or adjusted under 35 U.S.C. 154(b) by 697 days.

(21) Appl. No.: 11/659,306

(22) PCT Filed: May 11, 2005

(86) PCT No.: PCT/BR2005/000078
§ 371 (c)(1),
(2), (4) Date: Jun. 16, 2008

(87) PCT Pub. No.: WO2006/012717
PCT Pub. Date: Feb. 9, 2006

(65) Prior Publication Data
US 2008/0284548 A1  Nov. 20, 2008

(30) Foreign Application Priority Data
Aug. 3, 2004 (AR) .................................. P040102767

(51) Int. Cl.
*H02H 3/08* (2006.01)
(52) U.S. Cl. ...................................................... 361/93.2
(58) Field of Classification Search .................. 361/93.2
See application file for complete search history.

(56) References Cited

U.S. PATENT DOCUMENTS

| | | | | |
|---|---|---|---|---|
| 4,829,298 A | * | 5/1989 | Fernandes | 340/870.27 |
| 5,097,380 A | | 3/1992 | Moran | |
| 5,162,967 A | | 11/1992 | Ojanguren Torrontequi | |
| 5,293,522 A | | 3/1994 | Fello et al. | |
| 5,357,068 A | * | 10/1994 | Rozier | 218/44 |
| 5,684,710 A | * | 11/1997 | Ehlers et al. | 700/293 |
| 5,751,222 A | * | 5/1998 | Trainor et al. | 710/1 |

(Continued)

FOREIGN PATENT DOCUMENTS

AR  245312  12/1993

(Continued)

*Primary Examiner* — Ronald W Leja
(74) *Attorney, Agent, or Firm* — Michael M. Rickin; Melissa J. Szczepanik (57) ABSTRACT

A method for sectioning a medium-voltage distribution electric line evidencing a disturbance using a section switch. The steps are: (a) detecting a current having an amplitude and a wave form profile in the medium-voltage line; (b) analyzing the wave form profile to determine whether the fault is transient, permanent, a transformer input current or transformer in-rush current; (c) and determining the behavior of the section switch from the result of the wave form profile analysis. The section switch is installed on auxiliary branches of a distribution network having a main line that is protected by an automatic reset circuit breaker. The section switch has an opening mechanism having a coil and an electronic circuit. The electronic circuit has a power source for the coil and electronic circuit, a detector to detect current and an analyzer to determine whether the detected current is a transient or a permanent fault.

36 Claims, 6 Drawing Sheets

U.S. PATENT DOCUMENTS

| | | | |
|---|---|---|---|
| 5,822,165 A * | 10/1998 | Moran | 361/78 |
| 5,963,457 A * | 10/1999 | Kanoi et al. | 700/291 |
| 6,061,609 A * | 5/2000 | Kanoi et al. | 700/291 |
| 6,753,493 B2 | 6/2004 | Rhein et al. | |
| 6,778,370 B1 | 8/2004 | LaPlace et al. | |
| 6,885,674 B2 * | 4/2005 | Hunt et al. | 370/420 |
| 6,947,854 B2 * | 9/2005 | Swarztrauber et al. | 702/62 |
| 7,174,261 B2 * | 2/2007 | Gunn et al. | 702/62 |
| 7,281,143 B2 * | 10/2007 | Parra et al. | 713/320 |
| 7,518,529 B2 * | 4/2009 | O'Sullivan et al. | 340/870.27 |
| 2004/0027747 A1 | 2/2004 | Kim et al. | |

FOREIGN PATENT DOCUMENTS

| | | |
|---|---|---|
| AR | 017247 A1 | 9/2001 |
| AR | 026694 B1 | 2/2003 |
| WO | 94/03954 A1 | 2/1994 |

* cited by examiner

METHOD FOR SECTIONING WITH A SECTION SWITCH A MEDIUM-VOLTAGE ELECTRIC POWER DISTRIBUTION LINE EXHIBITING A DISTURBANCE, SECTION SWITCH FOR MEDIUM-VOLTAGE ELECTRIC POWER DISTRIBUTION LINE APPLICABLE THEREON AND ELECTRONIC CIRCUIT FOR DETECTING A FAULT CURRENT AND COMPRISED BY SAID SECTION SWITCH

FIELD OF THE INVENTION

The present invention generally refers to a method for sectioning an electric power distribution line and to improvements made to a section switch for electric power distribution lines and, more particularly, to improvements to an electronic circuit for detecting the fault current, which is intended to isolate an auxiliary line from a main line in a power transmission system

PRIOR ART DISCLOSURE

First, and as an introduction, we will refer to some theoretical explanations about the methods and section switches of the prior art, which will be useful in illustrating the field of the art to which the present invention pertains.

Section switches are devices used in the electric protection of voltage distribution aerial lines, particularly for medium-voltage equipment, such as, for example, lines in the range of voltages from over 1.000 V (1 kV) to 36.000 V (36 kV).

Previously known electric distribution systems consist in main lines of power distribution, from which several secondary or auxiliary feed lines derive. When there are faults in said systems, because of the arrangement of power lines, it is possible to isolate the secondary line where the fault is present, without affecting the rest of the distribution system.

In a power distribution system like the one described above, an overload protection is located near the feeding source, in the form of an automatic reset circuit breaker, which will be activated if an abnormal and transient current occurs within the system and will then isolate the whole system from the power source.

Once the said system is activated, the whole system will remain without current for a time during interruption and resetting of the circuit breaker. The circuit breaker can be frequently reset by multiple brief discharges, more than once before the system is blocked.

Another form of protection for said system is by means of expelling fuses mounted on a stick. These fuses comprise a fuse link arranged through an isolating space. The fuse link is within a non-metallic tube located through said space positioned by a simple mechanism which is engaged, by itself, by the intact fuse link. As a result, the fuse link is stressed. The fuse link of the expelling fuse is provided with a fuse element which is blown when circulating on a sufficiently extended transient overcurrent within the fuse. When the fuse element is blown, the circuit is physically cut, though not yet electrically, and an arc is produced within the tube. This arc normally remains during a period of 10 and 100 milliseconds and can be accompanied by a strong explosion within the tube, which explosion can produce flames and emit hot gas and reach up to 2 meters outside each tube end. Due to blowing of the fuse element, the tube is disengaged from the fuse support, but the arc starts and ends when the tube is largely in a closed position, while there is still a regular electric contact between the upper part of the tube and the top contact of the fuse support.

At the end of the arc, the upper prat of the tube continues to become detached from the upper part of the fuse support, and, finally, the tube hangs in an inverted position regarding the lower part of the fuse support, thereby producing an isolating distance and visually indicating the line installer that the fuse is burnt out.

Different kinds of protection are used in the art related to electric distribution networks. One of them, known as "Group Fuse System", is widely used, for example, on aerial line networks of up to 36 kV. At a substation in said systems, a switch is placed, which can be of the kind filled with oil, particularly an automatic reset circuit breaker, in each circuit of the feeder outlet. Each of these circuits feeds in turn power into the several secondary lines or branches. Each branch or group of secondary lines or branches can be single-phased or three-phased and can have two or three protection fuses, respectively. This arrangement constitutes an example of the manner in which fuses and circuit breakers can be used in a sequential pattern.

The reason for which this arrangement is used with fuses and circuit breakers is the following: when there is a permanent fault, the fuse will isolate the fault contained in part of the network, while, when there is a temporary or transient fault, the circuit breaker will be opened for a time sufficient for the fault to disappear.

A permanent fault is one where a damage is caused and is generally associated to a short-circuit.

A transient fault is the one which is likely to disappear by itself when the current flow produced by the fault is cut for a short time. These faults are generally caused by local discharges produced through isolating materials, due to voltages induced by rays in the lines. It is desirably to treat a transient fault by the cutting and automatic resetting of a circuit breaker.

However, when a permanent fault occurs in one of the power leads, it is not advisable to have the main circuit breaker permanently open and, for this reason, it is desirable to achieve protection by fuses for secondary lines. If a fuse is actuated, only a small area of the network is disconnected. However, it is not convenient to have a fusible actuated if there is a transient fault, which can be dealt with by the main section switch. For this reason, the activity of fuses and circuit breakers should be correctly compensated.

In addition, there are currents on the medium-voltage network which are generated when starting up vacuum transformers, which could be interpreted as fault current. A transformer input current, also known as "inrush" current, is characterized by being six times greater than the nominal current of the transformer, by having a very short time duration and for being strongly unidirectional.

Now, in some cases and depending on branch configuration and the amount of operating transformers, the wave form of the transformer input current is no longer unidirectional and can be almost symmetrical, though with high harmonic level.

Initially, it is not possible to know whether the fault is permanent or transient, or whether the same is a transformer input current or in-rush current.

Then, a suitable sequence of operations is desirable, where the main circuit breaker, in all cases, will cut off and reset again after a few seconds. If the fault disappears, then, it is a transient fault which has already disappeared. If the fault still remains, the circuit breaker will remain closed in order to allow the activation of a fuse. In order to have said alternatives available in protection equipment, no fuse should be activated before the circuit breaker is disconnected.

The drawbacks encountered by the above-described system are that an adequate coordination between fuses and breakers is not always possible, since fuses change their characteristics over time and when replacement is required they usually change their cutting capacities and lose any coordination. Further, fuses can be very noisy when activated and can cause fire in the area of installation as a result of the hot particles being expelled during interruption.

In turn, devices for isolating a secondary line from a main line in an electric power distribution system are well-known in the art, such as the one disclosed in Argentine Patent No. 245.312, which is herein entirely incorporated as reference.

The section switch illustrated in said patent is assembled on the ends of a support isolating element, with connection points on each of said ends, and comprises two end bottles each positioned on the end of the leading tube on which there is at least one current detecting transformer connected to an electric circuit which outlet is connected to a chemical actuator, fixed to one of said end bottles, and which comprises a triggering or activating element supported on a rotating cam in contact with one of the points of disconnection, thereby keeping the end bottle locked against a connecting element.

As an improvement to the above mentioned opening mechanism, Argentine Patent Application No. P99 01 05278, published as AR017247 A1 on Sep. 5, 2001, in Patent and Trademark Bulletin No. 1936/400, replaced the chemical actuator by a coil with a coil bolt and a bolt spring on which a capacitor is discharged, which, in the case of the above patent, was discharged on the chemical actuator.

This improvement brought about certain advantages, among which, we can now state that there is no longer necessary to replace the actuator. When the system was triggered by the devices of the prior art, such as the one disclosed in Argentine Patent No 245.312, it was necessary for the repair service personnel to always carry chemical actuators to reconnect or reset the system. That involved an embarrassing operation and significant operative costs. Instead, according to the opening mechanism proposed by said Argentine Patent Application No. No P99 01 05278, the interlocking assembly should be only manually replaced to its closed position by manually bringing the interlocking bolt to its initial or starting position.

However, said patent still fails to certainly determine, when the current generating the problem is due to a transient fault current, whether the same is caused by a transformer input current or in-rush current, which has led to one of the improvements being the object of this present application, such as herein below described in more detail.

Further, it is desirable that the opening of a two-phase or three-phase section switch be simultaneous with other or others switches in order to solve, for example, the problems encountered by mechanical devices of the prior art. This simultaneous opening is necessary to solve the problem created by phase openings on networks in cases where ferro resonance occurs, such as in the case of medium-voltage aerial circuits, generally rural ones, where serial resonance can occur between saturable reactance from medium-voltage transformer to medium voltage ((MV/MV) or from medium voltage to low voltage (MV/LV) and the ground capacity of the medium-voltage line.

The above situation can cause the transformer to explode and to become wholly useless.

Then, it is another object of this present invention to provide a two-phase or three-phase actuated section switch for electric power lines, to be installed in a branch of the power network which main feed line comprises an automatic reset device with two-phase or three-phase opening. Said actuation is to be efficient and repetitive every time the same is required by the system Both the main object and the accessory advantages of this present invention are made evident in the following description containing the preferred and accessory mode of embodiments thereof.

SUMMARY OF THE INVENTION

It is a first object of this present invention to provide a method for sectioning a medium-voltage distribution electric line evidencing a disturbance, wherein said method comprises the stages of: (a) evaluating a current in a medium-voltage line with a detection coil; (b) converting the intensity generated by said current by the detection coil in a potential difference, further transferring the wave-profile information to a microcontroller; (c) analyzing the profile of the wave generated by the current by an algorithm for the analysis of harmonic levels by Fourier Series, and (d) determining the behavior or the section switch from the result obtained in (c).

Stage or step d) can comprise: (i) making no count to trigger the disconnection mechanism when the current value does not exceed a predetermined value for which that current is detected as a fault current, or (ii) making no count to trigger the disconnection mechanism when the wave profile corresponds to a transformer input current or in-rush current, or (iii) making a count to trigger the disconnection mechanism when the wave profile corresponds to a short-circuit exceeding the predetermined current value for which said current is detected as a fault current. In case (iii), the method always comprises steps e) of (i) not triggering the disconnection mechanism when a transient fault is involved, or (ii) triggering the disconnection mechanism and sectioning the line when a permanent fault is involved, if a number of counts is reached.

In another embodiment of the present invention, said method can further comprise the step of: f) simultaneously with step e), (ii) sending a RF signal to other or others connected section switches at a point of the distribution line in order to have all phases simultaneously disconnected.

It is a further object of this present invention to provide a medium-voltage electric power section switch of the kind suitable to be installed on accessory branches of the distribution network, where the main line is protected by an automatic reset circuit breaker, which comprises an electronic circuit with a microcontroller that can distinguish between a permanent and a transient fault current, by immunizing the section switch against transformer input currents or in-rush currents.

In another mode of embodiment, the section switch comprises a radiofrequency transmitter which allows transmitting the disconnection order to other section switches connected at the same point in order to achieve the simultaneous disconnection of all phases.

It is a further object of the present invention to provide an electronic circuit comprising a microcontroller that can distinguish a permanent fault current from a transient fault current, by immunizing the section switch against transformer input currents or in-rush currents.

In another embodiment, the circuit comprises a radio frequency transmitter which allows transmitting the disconnection order to other circuits of the section switches connected at the same point of the line to achieve the simultaneous disconnection of all phases.

BRIEF DESCRIPTION OF THE DRAWINGS

FIGS. 1, 2, 3, 4, 5, 6 y 7 are attached hereto, which show the structure of the section switch and the opening mechanism.

DETAILED DESCRIPTION OF THE INVENTION

In this present description, the terms "count" or "counts" refer to each event or events occurring during detection of a fault current and line opening. This event is carried out by an automatic reset circuit breaker, or a reset device or a circuit breaker with an adequate logic, which protects the main line and a section switch installed downstream an auxiliary branch of the distribution network. Both the circuit breaker and the section switch are capable of carrying out counts, where the adjustment of the count number of the section switch is better than that of the section switch. When a voltage above the calibration value is detected, the circuit breaker or an equivalent device disconnects the main line and leaves it without power circulation, thereby producing the first "count", while the section switch also carries out the first "count". Then, so many subsequent counts occur depending on calibration of devices and duration of the fault, until the section switch responds by isolating the branch having the fault, if this is a permanent one.

The methods for sectioning an electric current distribution line of the prior art have the problem that they are not capable of certainly and repeatedly distinguishing a transient fault situation and, in this latter case, of determining whether a transformer input current or in-rush current is involved.

It is the object of this present invention to provide a method for sectioning with a section switch a medium-voltage electric current distribution line showing a disturbance, and where said method comprises the steps of:
a) evaluating the current on a medium-voltage line by a detection coil;
b) converting the intensity generated by said current in the detection coil into a potential difference, by transferring the wave profile information to a microprocessor;
c) analyzing the wave profile generated by the current by an algorithm for analyzing the harmonic levels by Fourier Series; and
d) determining the section switch behavior on the basis of the result obtained in c).

According to the result obtained upon analyzing the profile of the wave generated by the current in step c), then:
Step d) comprises: (i) making no count to trigger the disconnection mechanism when the current value does not exceed a predetermined value for which said current is detected as a fault current;
Step d) comprises: ii) making no count to trigger the disconnection mechanism when el the wave profile corresponds to a transformer input current or in-rush current; or
Step d) comprises: iii) making a count to trigger the disconnection mechanism when the wave profile corresponds to a short-circuit exceeding the predetermined current value for which said current is detected as a fault current.

The above described method further comprises step e) comprising: (i) not triggering the disconnection mechanism when a transient fault is involved; or either, (ii) triggering the disconnection mechanism and sectioning the line when the predetermined count number is reached, when a permanent fault is involved.

This method is carried out by the internal electronic circuit of a section switch, which circuit commands the triggering of a coupled disconnection mechanism. The section switch opening time is of less than 500 ms (milliseconds).

Then, it is a further object of this present invention to provide a section switch which is designed to operate, mainly, on a medium-voltage electric power distribution system, where the main line is provided with an automatic reset circuit breaker having multiple brief discharges.

Figure 1:
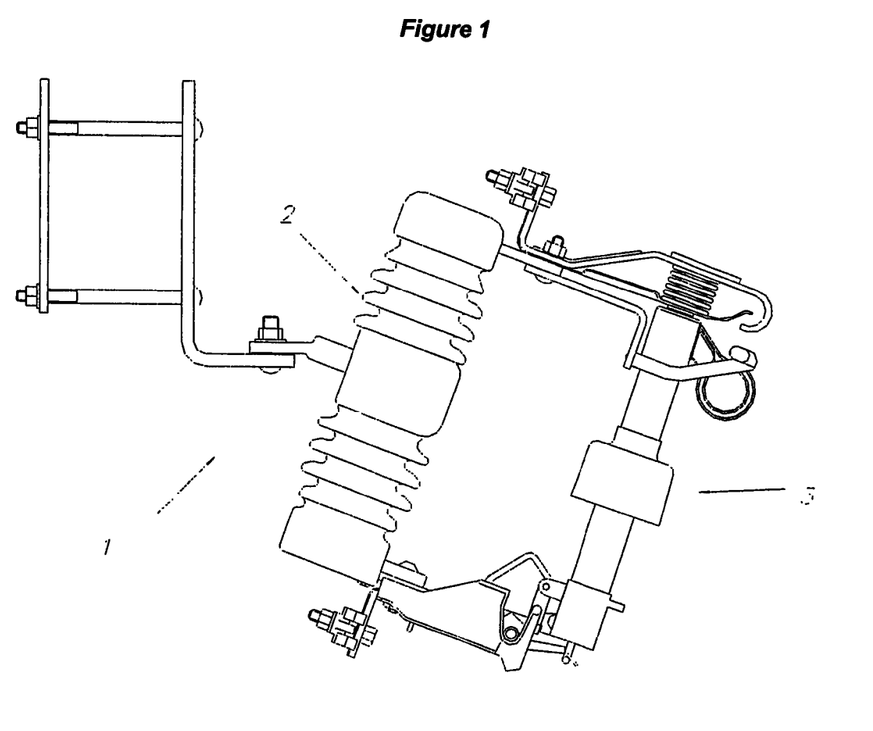
FIG. 1 is a general and side elevation view of the section switch formed by the fuse support and the section switch module.
Figure 2:
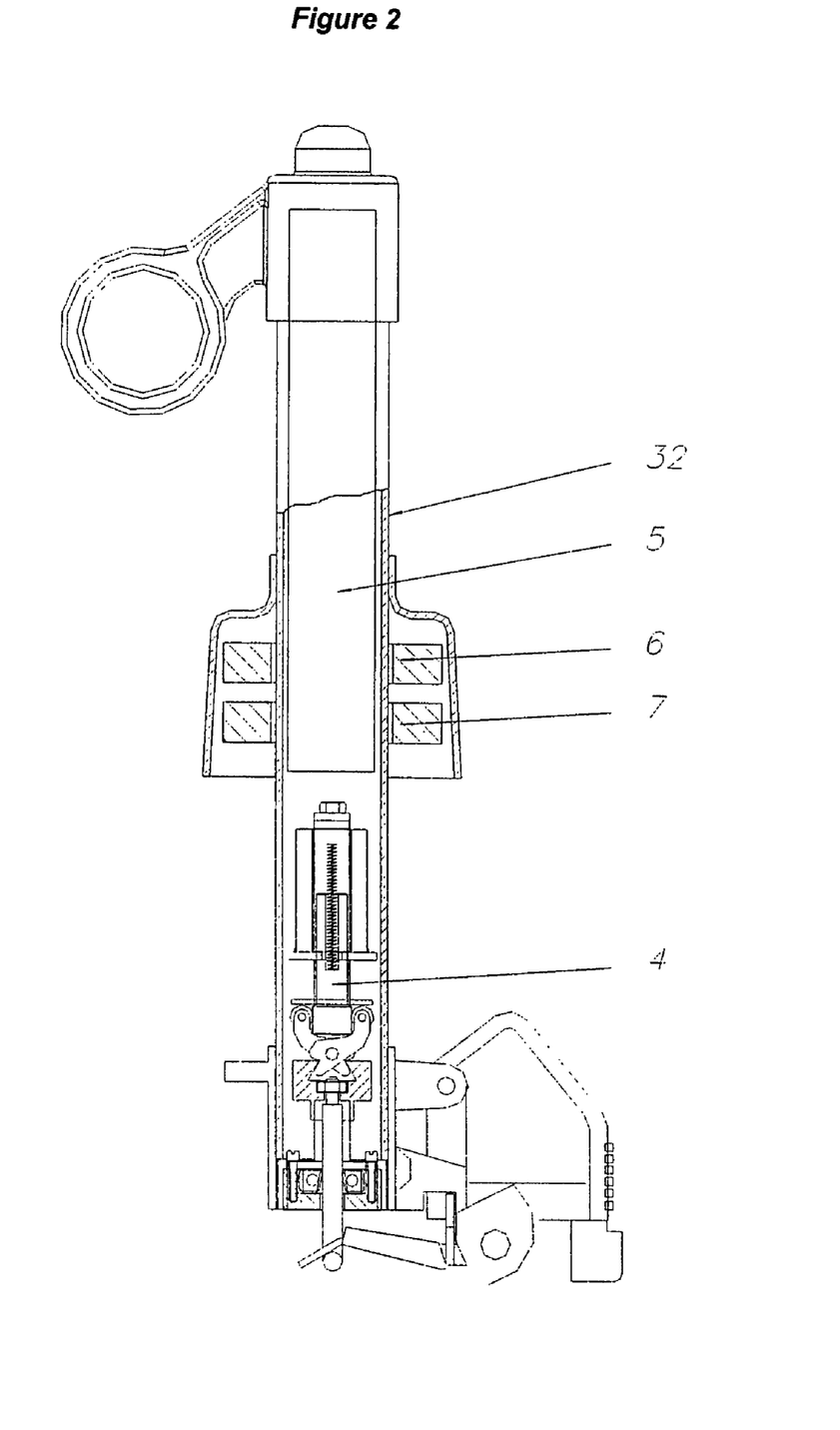
FIG. 2 is a side view illustrating in detail the structure of the section switch module.

In accordance with the illustration, a section switch is provided which has a preferred mode of embodiment of the invention, indicated with general reference (1) in FIG. 1, and which comprises an expelling fuse support (2) which comprises a line section switch module (3). Section switch (3) is of the kind suitable to be used in isolating a main line from auxiliary fault lines in an aerial electric power distribution system FIG. 2 shows the relative arrangement of basic components of a preferred mode of embodiment of this present invention, namely, the opening mechanism (4) of the section switch, the electronic circuit (5), the source toroidal coil (6) and the detecting toroidal coil (7).

Figure 3:
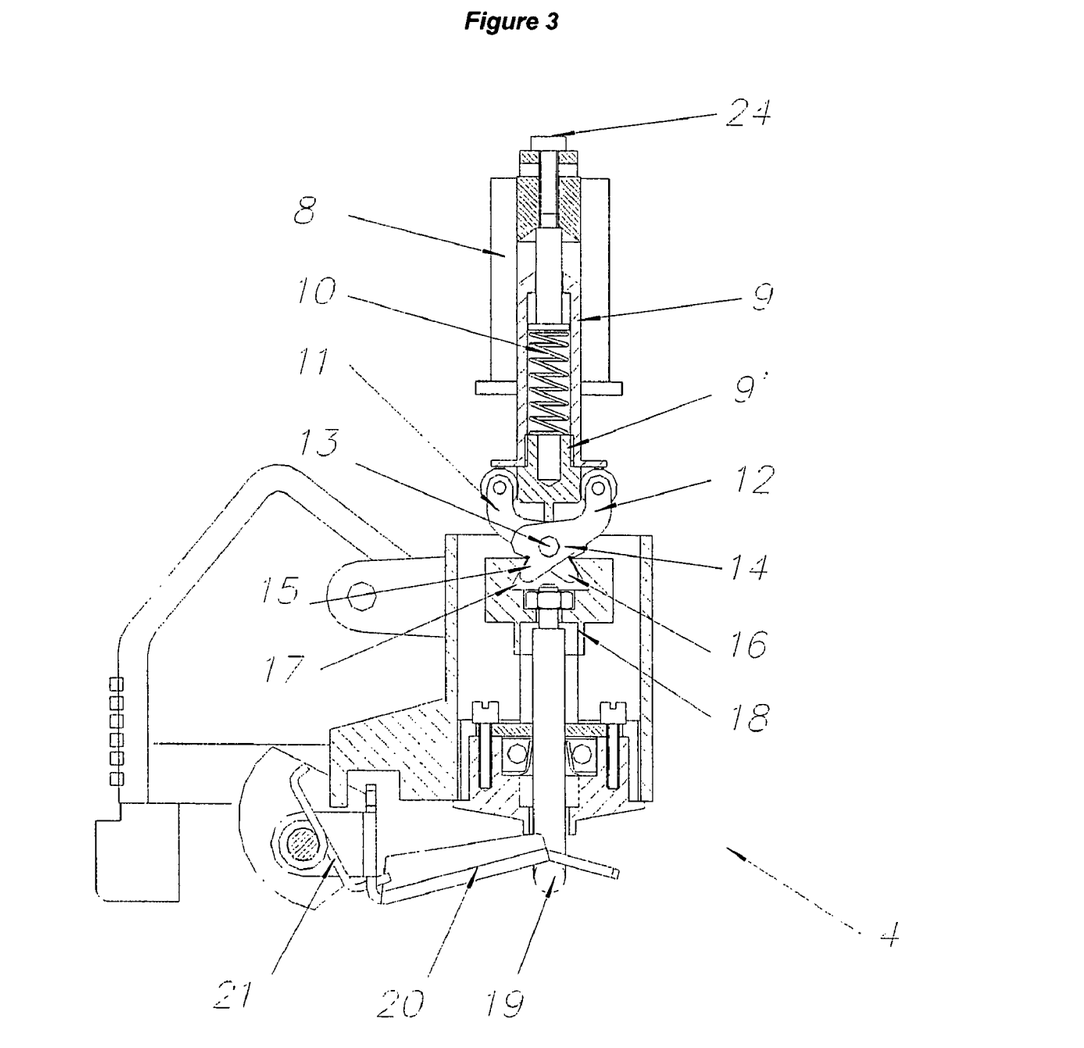
FIG. 3 is a side view illustrating in detail the opening mechanism of the section switch module.

As shown by FIG. 3, the opening mechanism (4) of a preferred form of embodiment of the section switch of this invention includes a coil (8) comprising a coil bolt (9) and a bolt spring (10) on which capacitor (26) is discharged. Said discharge draws or pulls the coil bolt (9) which the action of the spring (10) has kept outwards.

The mechanism includes two cams (11, 12) pivoting on a roller (13) and are kept apart or open, such as shown in FIG. 3, as a result of end (9') of bolt (9) being positioned between them.

Thus, when said bolt is drawn or attracted by the action exerted from discharge of capacitor (26) on coil (8), cams (11, 12) tend to come together by the action exerted by reclosing spring (14) thereon while they pivot on said roller (13)

As each of said cams (11, 12) comprise respective wedges (15, 16) housed on a locking pattern in a locking gap (17) of the blocking slider (18), rotating them causes said wedges (15, 16) to lose the interlocking contact they had with the inner walls of said gap (17), thereby releasing or unlocking said blocking slider (18).

Once unlocked, bolt (9') is lowered, which is due to the drawing force generated by the interlocking bolt (19) on said blocking slider (18) to which it is related, since said interlocking bolt (19) is in turn attracted by the pulling spring (21).

Thus, when there is a permanent fault, the above described opening mechanism (4) produces the opening of the section switch.

Figure 4:
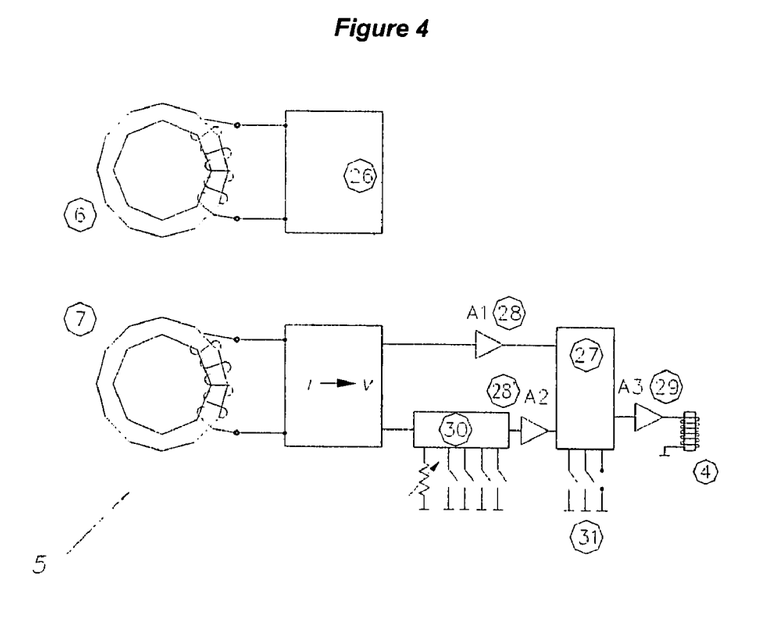
FIG. 4 is a schematic view of a preferred embodiment of the electronic circuit being the object of the present invention.

Electronic circuit (5) is the one to determine whether the fault is permanent, transient or a transformer input current, also known as an in-rush current, as all events produced in the section switch being the object of this invention lie in said circuit.

Electronic circuit (5), such as schematically illustrated in FIG. 4, is formed by a toroidal coil (6), which is the one to supply the power for loading of a capacitor (26) acting as a source and supplying power for the operation of the microprocessor (27), operational devices or elements (A1 28, A2 28' y A3 29) and coil (8) of the opening mechanism (4).

The fault current of the network is detected by a detecting toroidal coil (7) which generates a tension or drawing force proportional to the network current and exactly reproduces the wave form thereof.

The inlet signal is received by an attenuator (30) which, together with amplifier A1 (28), should then adjust the calibration current levels. Simultaneously, the incoming signal is also received by amplifier A2 (28') which amplifies the voltage level for detecting the zero voltage.

Based on the information delivered by operational amplifiers A1 (28) and A2 (28"), microcontroller (27) carries out the logic operation by detecting, through a spectrum-based analysis, the wave form of the line current by means of an algorithm analyzing the harmonic levels by Fourier Series, thereby allowing to distinguish whether a permanent fault current or a transient fault current is involved, or, either, an in-rush current.

If the fault current is permanent, microcontroller (27) effects the complete sequence, considering the number of counts for which the same was prepared and sends the amplified signal from amplifier A3 (29) to coil (8) of the opening mechanism (4) and opens the section switch.

Instead, if the line fault current is a transient one, the microcontroller shall make the necessary number of counts to cause such fault current to disappear, to reset and to forget about the count 30 second later.

Now, if the overcurrent existing on the line is generated by input of one or several transformers, the microcontroller shall distinguish the same, shall refrain from making the counts and, consequently, shall provide immunization against in-rush current.

In general, the wave form of an in-rush current is strongly unidirectional, but when there are several transformers operating in a network branch, non-unidirectional input currents can also occur, which currents may have almost symmetric wave forms, which shall not be detected as a fault current by the spectrum-based analysis carried out by the microcontroller, and, therefore, the section switch will not open.

The microcontroller is ready for the spectrum-based analysis of the fault current, when the network frequency is of 50 or 60 Hz, and the frequency change is effected by a connection in the electronic circuit.

Another novel aspect of this present invention is the versatility of the electronic section switch as to setting changes thereon, regarding calibration current and number of counts to be made before the opening.

Up to date, such changes were made only by the manufacturer, but with the section switch of the present invention, such changes can be directly made by users by changing the position of the attenuator keys (30) for the calibration current and the keys (31) for defining the number of counts. In the example, 16 different combinations are obtained for the calibration current and 4 different steps for the number of counts, which can be increased by adding more keys.

In fact, the section switch of this invention comprises an attenuator (30) consisting in a series of resistances interposed in the circuit by 4 keys, and according to the combination of these keys, 16 different steps as to actuating current can be obtained. Versatility of said section switch can be attained by incorporating a key until attaining the number of keys suitable to obtain a fully versatile product as required by the market.

In the section switch of the prior art, the actuating current is adjusted by a variable or "preset" resistance, which made it necessary to calibrate the section switch in a laboratory and to have the necessary equipment to that effect, such as a current source, measuring instruments, among other equipment. This equipment is not usually available in all places where section switches are used, and, therefore, the present invention proves to be quite practical because a same section switch has managed to obtain a whole range of variation on calibration current and count numbers, without need of any other instruments and by the easy and available selection of the corresponding keys. This allows reducing the stock of section switches in warehouses, since this single model is adjustable to all circumstances.

On the other hand, and as above state, the section switch can be adapted to the network frequency—which is fixed in each country—by the manufacturer or by a key or welding point, which makes it even more versatile.

This electronic circuit (5) is housed within the tube (32), which defines the current passage through the fuse support (2), but only while the actuating module is in a leading position such as shown in FIG. 1.

Finally, it is to be noted that once the section switch is opened, the cause of said opening should be repaired. After that, the section switch should be re-positioned by opening the cams prevailing over the reclosing action by the spring. When said cams (11, 12) are closed, the respective wedges (15, 16) are also closed so as to have them again introduced into the locking gap (17) of the blocking slider (18). Thus, they are then pivoted to a closing direction, which allows said wedges (15, 16) to resume their interlocking contact with said gap (17), thereby relocking the said blocking slider (18).

It is to be noted here that, when it is necessary to make a maneuver on the power network which requires the opening of the section switch under load, there are two possible alternatives depending on the kind of section switch involved.

There is a first kind of electronic section switch which is the most common one, such as sown in FIG. 1, and, if it is desirable to open the same under load, a special pole known as "load buster" should be used to that effect, which pole comprises a chamber extinguishing the electric arc generated at the time of the opening.

Figure 5:
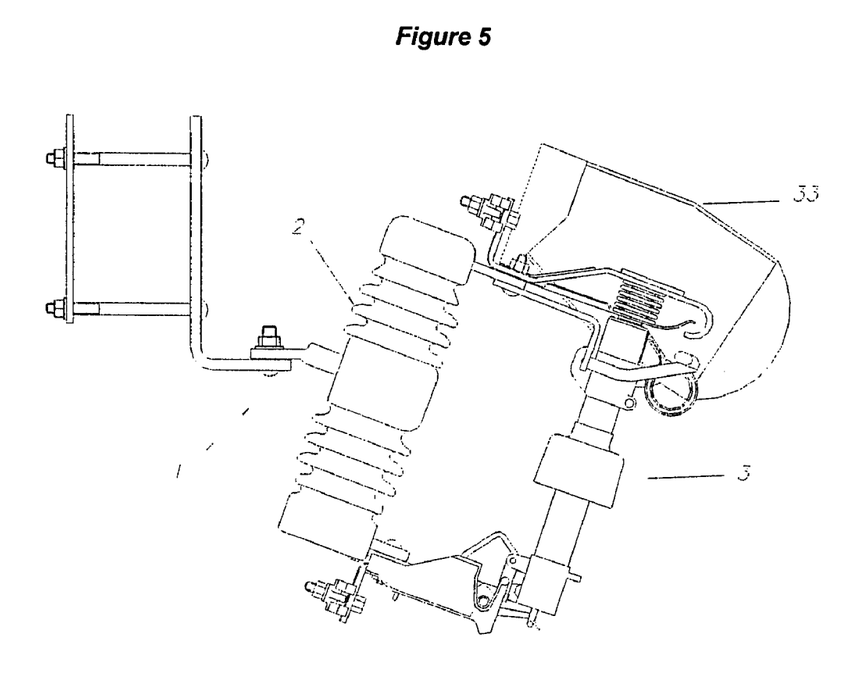
FIG. 5 is a general and side elevation view of another embodiment of the section switch formed by the fuse support and the section switch module with incorporated spark screen chamber.

There is a second kind of electronic section switch, such as the one shown in FIG. 5, which includes an arc extinguishing chamber (33) or spark screen chamber on the upper contact of the section switch base. This kind of section switch can be opened at the time when the network nominal current circulates along the same, with a standard pole. The electric arc generated at the time of the opening is extinguished by the spark screen chamber included in the section switch.

The rest of the pieces making up the section switch have the same physical and functional characteristics as the section switches of the prior art, and, therefore, they are not described herein in detail.

According to a preferred embodiment of the method of this invention, the opening of the one-phase section switch can be simultaneously coupled with other section switches mounted at the same point of two-phase or three-phase lines.

An advantage of the section switch of the present invention is that a radio frequency transmitter-receiver communication module can be attached thereto, so as to form pairs or triplets of identical section switches while its opening can be advantageously bipolar or tripolar and, therefore, constitutes a beneficial alternative for those feed network branches where openings of only one of their phases can be detrimental for the equipment connected thereto.

This can be achieved by section switches present in each of the phases comprising a signal transmitter-receiver circuit connected to the section switch triggering circuit, such that a coded signal is emitted when the latter is activated, and which signal is caught by the circuits corresponding to the other phases, in a manner capable of triggering the section switch of said other phases when their current is null. In said other preferred embodiment of the invention, the signal of each two or three section switches at the same point of the line branch have the same frequency and their own code. In a preferred mode of embodiment of the invention, said signal is a fixed and coded modulated frequency signal with a limited range.

Thus, the method for sectioning with a section switch a medium-voltage electric line with a disturbance and as above described comprises the steps of:

a) evaluating a current in a medium-voltage line by means of a detection coil;
b) converting the intensity generated by said current in the detection coil into a potential difference, by transferring the wave profile information to a microprocessor;
c) analyzing the profile of the wave generated by the current by an algorithm to analyze the harmonic levels by Fourier Series, and, depending on results:
d) i) if the current value does not exceed a predetermined value for which said current is detected as a fault current, not making a count to trigger the disconnection mechanism; or
d) ii) if the wave profile corresponds to an in-rush current, not making a count to trigger the disconnection mechanism, or
d) iii) if the wave profile corresponds to a short-circuit exceeding the predetermined current value for which said current is detected as a fault current, making the count to trigger the disconnection mechanism; and if d) iii) occurs, the method further comprises the step of:
e) i) if the predetermined number of counts is not reached, not triggering the disconnection mechanism (transient fault); or
e) ii) if the predetermined number of counts is reached, triggering the disconnection mechanism and sectioning the line (permanent fault); and when in the two-phase or three-phase line there are section switches installed and jointly operating by a radio frequency transmitter-receiver communication module, the method further comprises the step of:
f) simultaneously with above step e'), sending a RF signal to other or others section switches parallel and jointly connected at a same point of the distribution network so as to trigger the respective disconnection mechanism and section the corresponding lines simultaneously.

On the other hand, the section switch of this invention, which is useful for carrying out the above describe method, comprises a circuit with a radio frequency transmitter-receiver communication module attached thereto.

Figure 6:
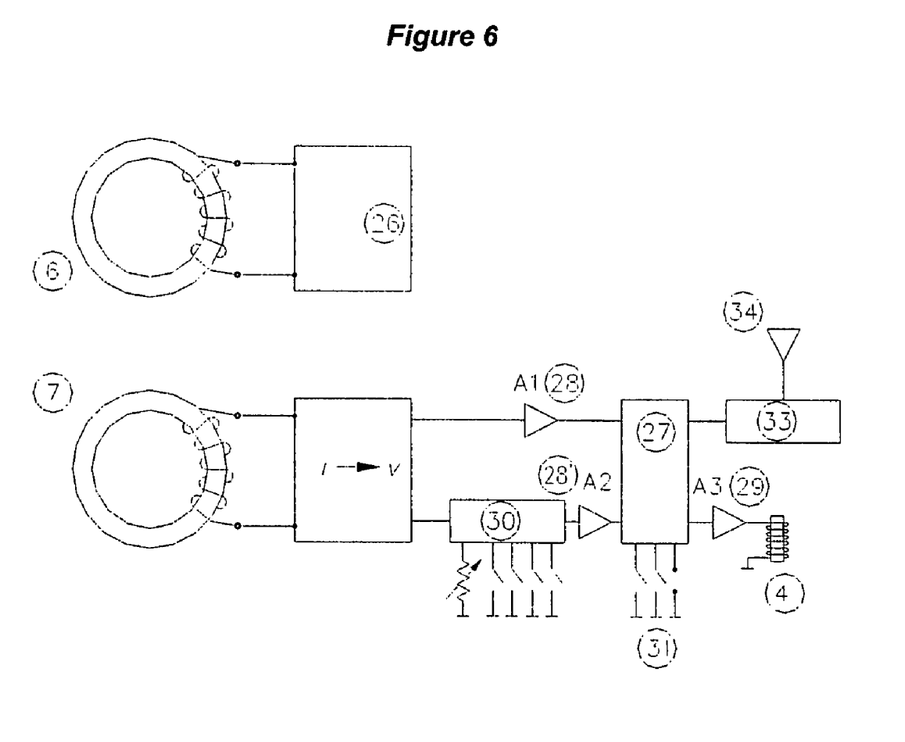
FIG. 6 is a schematic view of another preferred embodiment of the electronic circuit of the present invention, which comprises a RF communication module circuit and the antenna therefor, which sends a wireless signal to other or others section switches to have the line cut on a simultaneous pattern.
Figure 7:
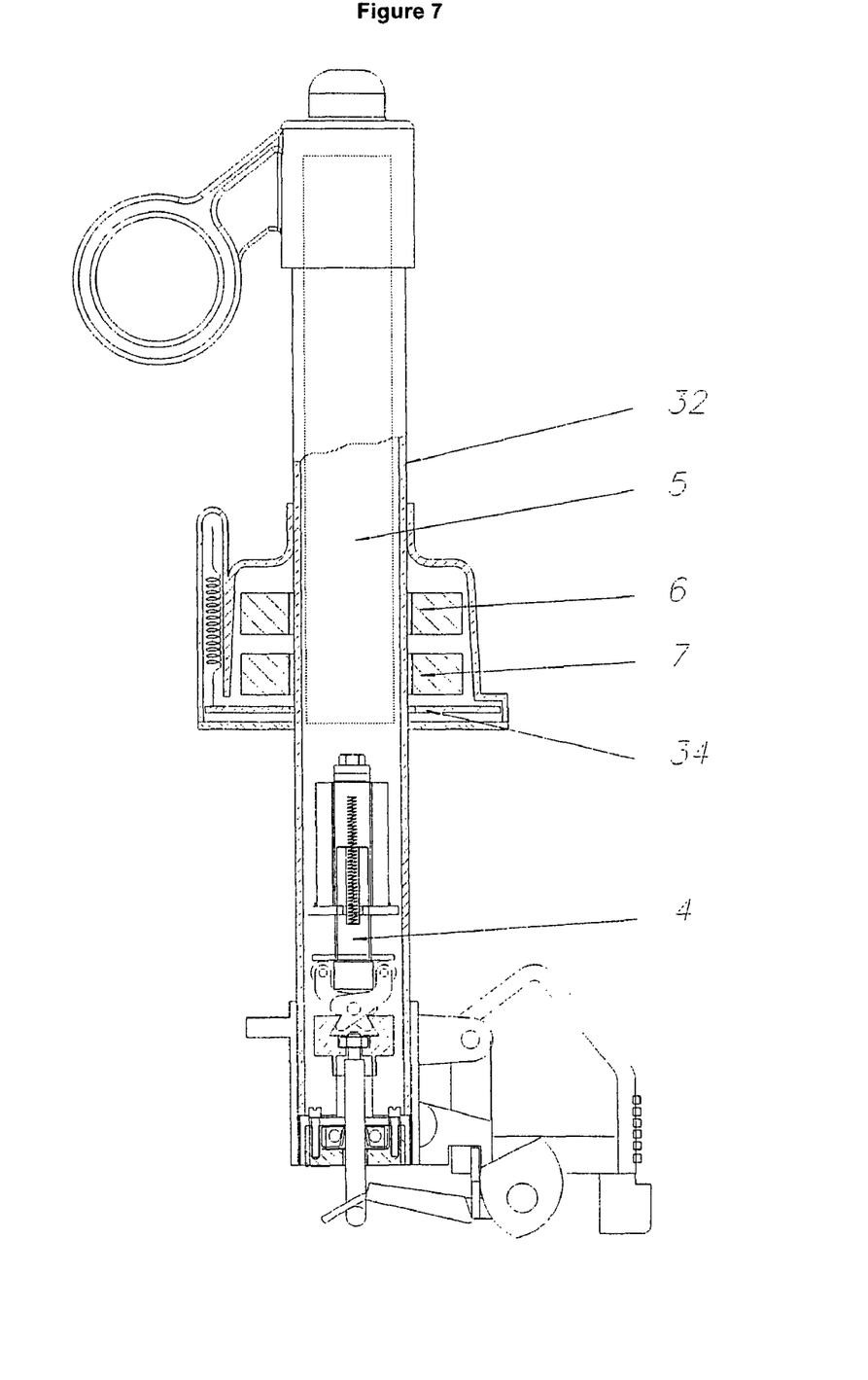
FIG. 7 is a side view illustrating in detail the structure of another embodiment of the section switch module, which comprises a RF communication module and the antenna therefor, which sends a wireless signal to other or others section switches to have the line cut on a simultaneous pattern.

Thus, when the section switch detects a permanent fault current, the microcontroller (27) performs the complete sequence based on the count number for which the same was prepared, sends the amplified signal by amplifier A3 (29) to coil (8) of the opening mechanism (4), and further opens the section switch of the phase showing the fault and sends simultaneously a coded signal or an order for opening, by means of the radiofrequency transmitter-receiver module (33) and the antenna thereof, to the other or others section switches, so that the same is bipolar or tripolar, respectively.

Then, when there is actually a permanent fault on one of the phases, the section switch of said phase will perform the operation sequence predetermined by the number of counts and will send, on the one hand, a signal to its own triggering mechanism and, on the other hand, will also send a coded signal through one antenna (34) to section switches by means of a transmitter-receiver circuit (33) of the other or other phases so as to effect the simultaneous opening.

This coded signal sent by the acting section switch is received in turn by the antenna of each of the other receiver circuits corresponding to section switches of the other phases of the three-phase line, which sends a signal actuating the electromechanical device and opens the section switch, such that the feed to said other line or lines is interrupted depending on whether there is a two-phase or three-phase installation, the line branch being then disconnected from the main line.

As section switch should operate without load, the head re-setter should be programmed to effect a two-phase or three-phase opening on the operation corresponding to the count number for triggering the electronic automatic section switch.

As section switches within the branch disconnection assembly are linked by a coded radio signal, with a specific coding for each assembly, any interaction or interference is thereby prevented among the different set of section switches on the line.

INDUSTRIAL USE OF THE INVENTION

This present invention is applicable to any industry related to the generation of electric power, particularly industries engaged in the supply and distribution of electricity, as well as the metallurgical industry engaged in manufacture of the proposed section switch and the electronic industry related to manufacture of the circuit involved, which will be broadly benefited from the availability of a section switch and circuit intended to provide a better protection for secondary line branches in medium-voltage networks.

A direct advantage from use of the method employing the proposed section switch is to eliminate unnecessary cuts due to wrongly detected fault currents, by distinguishing among permanent faults, transient faults and those transformer input currents or in-rush currents in secondary line branches of electric power distribution networks, all of which is now achieved by the above described electronic circuit which is comprised by said section switch.

FINAL CONSIDERATIONS

Several modification and variations to the method, section switch and electronic circuit disclosed in this present application shall become evident to the experts in the art, without departing from the scope and the spirit of the invention. While this invention has been described as related to the preferred mode of embodiments, it is to be understood that the invention, such as claimed, should not be unduly limited to said specific embodiments. In fact, the several changes to the above described embodiments to carry out the invention being obvious to an expert in the corresponding art are to be included within the scope of the following claims.

The claims form part of the description of the invention being the object of this patent application.

The invention claimed is:

1. A method for sectioning with a section switch a medium-voltage electric power distribution line exhibiting a disturbance, said method comprising the steps of:
   (a) detecting a current having an amplitude and a wave form profile in said medium-voltage line;
   (b) analyzing said wave form profile to determine if said disturbance is either a transient fault current or a permanent fault current or a transformer input current or in-rush current; and
   (c) determining the behavior of the section switch from the result of said wave form profile analysis.

2. The method of claim 1, wherein step c) comprises making no count for triggering a disconnection mechanism when the current amplitude does not exceed a predetermined value for which said current is detected as a fault current.

3. The method of claim 1, wherein step c) comprises making no count for triggering a disconnection mechanism when the wave form profile corresponds to a transformer input current or in-rush current.

4. The method of claim 1, wherein step c) comprises making a count for triggering a disconnection mechanism when the wave form profile corresponds to a short-circuit exceeding a predetermined current value for which said current is detected as a fault current.

5. The method of claim 4, further comprising the step d) of not triggering the disconnection mechanism when said analysis determines that said detected current is for a transient fault.

6. The method of claim 4, further comprising the step d) of triggering the disconnection mechanism and sectioning the line when a predetermined number of said counts are reached.

7. The method of claim 6, further comprising simultaneously executing with step d) a step e) of sending a RF signal to other section switches connected in parallel with said section switch at a same point of a distribution network for simultaneously triggering each of their respective disconnection mechanism thereby sectioning their corresponding medium-voltage lines.

8. The method of claim 7, wherein the RF signal is a fixed and coded modulated frequency signal with a limited range.

9. The method of claim 1, wherein said wave form profile analysis is by a Fourier Series.

10. The method of claim 1 further comprising opening said section switch when said determination from said wave form analysis is that said disturbance is a permanent fault current.

11. A section switch for medium-voltage electric power distribution lines, said section switch being of the kind suitable to be installed on auxiliary branches of a distribution network wherein a main line is protected by an automatic reset circuit breaker, said section switch comprising: an opening mechanism having a coil; and an electronic circuit comprising: a power source for both said electronic circuit and the coil of the opening mechanism; a detector to detect a current in said network having a wave form; and an analyzer to analyze said wave form to determine if said detected current in said network is either a transient fault current or a permanent fault current or a transformer input current or in-rush current.

12. The section switch of claim 11, wherein said detector generates a voltage proportional to the detected network current, thereby exactly reproducing the wave form thereof.

13. The section switch of claim 11 wherein said analyzer is a microcontroller and analyzes harmonic levels of said wave form to determine if said detected current in said network is either a transient fault current or a permanent fault current or a transformer input current or in-rush current.

14. The section switch of claim 13, wherein the microcontroller of the electronic circuit distinguishes a permanent fault current from a transient one, thereby immunizing the section switch against transformer input currents or in-rush currents.

15. The section switch of claim 13, wherein said permanent fault currents are identified by a spectrum-based analysis of the wave form of the detected line current, thereby immunizing the section switch against transformer input currents or in-rush currents.

16. The section switch of claim 15, wherein the spectrum-based analysis of the detected wave form of the line current is carried out by an algorithm to analyze harmonic levels by Fourier Series.

17. The section switch of claim 13, wherein if a permanent fault current is involved, the microcontroller will send an order to actuate the opening mechanism.

18. The section switch of claim 11, wherein the detector further comprises keys that allow modifying the setting of both a calibration current and that of the number of counts for triggering said opening mechanism that has to occur before the section switch triggers said opening mechanism.

19. The section switch of claim 11, wherein the time for opening of the section switch is less than 500 ms (milliseconds).

20. The section switch of claim 11, further comprising a base and an arc extinguishing chamber or spark screen chamber on a top contact of the section switch base.

21. The section switch of claim 11, further comprising a radio frequency transmitter-receiver communication module.

22. The section switch of claim 21, wherein the radio frequency transmitter-receiver communication module allows to interconnect pairs or ternaries of identical section switches for bipolar or tripolar opening, respectively.

23. The section switch of claim 21, wherein the radio frequency transmitter-receiver communication module is calibrated for a fixed and coded RF modulated signal of a limited range.

24. An electronic circuit for detecting a fault current, said electronic circuit adapted for use with a section switch for medium-voltage distribution lines, said section switch being of the kind suitable to be installed on auxiliary branches of a distribution network wherein a main line is protected by an automatic reset circuit breaker, said section switch comprising an opening mechanism having a coil, said electronic circuit comprising:
   a power source for both said electronic circuit and the opening mechanism coil;
   a detector to detect a current in said network having a wave form; and
   an analyzer to analyze said wave form to determine if said detected current in said network is either a transient fault current or a permanent fault current or a transformer input current or in-rush current.

25. The electronic circuit of claim 24, wherein said detector generates a voltage proportional to the network current, thereby exactly reproducing the wave form thereof.

26. The electronic circuit of claim 24 wherein said analyzer is a microcontroller and analyzes harmonic levels of said wave form to determine if said detected current in said network is either a transient fault current or a permanent fault current or a transformer input current or in-rush current.

27. The electronic circuit of claim 26, wherein the microcontroller of the electronic circuit distinguishes a permanent fault current from a transient fault current, thereby immunizing the section switch against transformer input currents or in-rush currents.

28. The electronic circuit of claim 27, wherein if a permanent fault current is involved, the microcontroller will send an order to actuate the opening mechanism.

29. The electronic circuit of claim 26, wherein the permanent fault currents are identified by a spectrum-based analysis of the detected wave form of the line current, thereby immunizing the section switch against transformer input currents or in-rush currents.

30. The electronic circuit of claim 29, wherein the spectrum-based analysis of the detected wave form of the line current is carried out by an algorithm to analyze harmonic levels by Fourier Series.

31. The electronic circuit of claim 24, wherein the detector further comprises keys that allow modifying the setting of both a calibration current and that of the number of counts for triggering said opening mechanism that has to occur before the section switch triggers said opening mechanism.

32. The electronic circuit of claim 24, wherein the time for opening of the section switch is less than 500 ms (milliseconds).

33. The electronic circuit of claim 24, further comprising a RF signal transmitter-receiver circuit.

34. The electronic circuit of claim 33, wherein the RF signal transmitter-receiver circuit transmits a coded signal when the opening mechanism is actuated by said electronic circuit.

35. The electronic circuit of claim 34, wherein the transmitted coded signal is received by RF signal transmitter-receiver circuits each associated with a respective one of section switch electronic circuits of other phases so as to trigger the opening mechanism of the section switches of said other phases when current thereof is null.

36. The electronic circuit of claim 33, wherein the radio frequency transmitter-receiver circuit is calibrated for a fixed and coded modulated RF signal of a limited range.

* * * * *